United States Patent [19]

Lee

[11] Patent Number: 4,804,844

[45] Date of Patent: Feb. 14, 1989

[54] METHOD AND APPARATUS FOR ENHANCEMENT OF PRIMARY PYROELECTRIC RESPONSE

[75] Inventor: John N. Lee, Silver Spring, Md.

[73] Assignee: The United States of America as represented by the Secretary of the Army, Washington, D.C.

[21] Appl. No.: 93,324

[22] Filed: Sep. 3, 1987

[51] Int. Cl.$^4$ .............................................. G01J 5/10
[52] U.S. Cl. ............................ 250/338.3; 250/338.1; 250/351
[58] Field of Search ............. 250/338 PY, 338 R, 369, 250/349, 350, 351; 307/234, 517, 514

[56] References Cited

U.S. PATENT DOCUMENTS

| | | | |
|---|---|---|---|
| 3,723,737 | 3/1973 | Zeldman et al. | 250/83.3 H |
| 3,773,564 | 11/1973 | Yamaka et al. | 136/213 |
| 3,818,356 | 6/1974 | Kinbara | 307/234 |
| 3,831,029 | 8/1974 | Jones et al. | 250/338 |
| 3,846,820 | 11/1974 | Lampe et al. | 357/31 |
| 3,855,864 | 12/1974 | Douglas | 73/355 R |
| 3,891,847 | 6/1975 | Schmidt et al. | 250/342 |
| 4,024,560 | 5/1977 | Miller et al. | 357/23 |
| 4,028,548 | 6/1977 | Scott | 250/330 |
| 4,032,783 | 6/1977 | Koda | 250/333 |
| 4,044,251 | 8/1977 | Taylor et al. | 250/342 |
| 4,060,729 | 11/1977 | Byer et al. | 250/338 |
| 4,081,679 | 3/1978 | Cohn | 250/338 |
| 4,117,328 | 9/1978 | Auphan | 250/330 |
| 4,155,007 | 5/1979 | Beckmann | 250/349 |
| 4,441,023 | 4/1984 | Doctor et al. | 250/338 PY |
| 4,570,157 | 2/1986 | Kodaira | 250/340 |
| 4,612,443 | 9/1986 | Alcidi | 250/369 |

OTHER PUBLICATIONS

Stotlar et al, "10.6 $\mu$m Damage Threshold Measurements on Sub-One-Hundred-ps Pyroelectric Detectors", 1979 IEEE Symposium on Applications of Ferroelectrics, Symposium Digest, p. 95, Jun. 1979; also published in Ferroelectrics, 1980, vol. 28, pp. 325-327.

Skolnik, Introduction to Radar Systems, 2nd Ed., McGraw Hill, 1980, Section 10.3, pp. 375-376.

Auston & Glass, "Optical Generation of Intense Picosecond Electrical Pulses", Appl. Phys. Lett., vol. 20, No. 10, May 15, 1972, pp. 398-399.

Stotlar et al, "Ultrafast Pyroelectric Detectors for $CO_2$ Laser Measurements", J. Optical Soc., vol. 69, No. 2, p. 373, Feb. 1979.

Primary Examiner—Janice A. Howell
Assistant Examiner—William F. Rauchholz
Attorney, Agent, or Firm—Saul Elbaum; Thomas E. McDonald; Walter R. Baylor

[57] ABSTRACT

Correlation is used to enhance the temporal resolution capability of incident energy detectors for high bandwidth signals. Such enhanced resolution is attained by using a primary response of the detectors, which may be weak but which accurately replicates the temporal waveshape of the incident energy pulse. A secondary response of the detectors, which is delayed from and more powerful than the primary response, but does not track the incident energy pulse as well as the primary, is correlated with the primary response. The secondary response is preferably passed through an inverse matched filter to provide a pulse more faithfully following the incident energy pulse prior to correlation with the primary response. Circuitry is provided for performing the enhancement, and a modulating device is used to permit the detector to respond to long-duration incident energy.

13 Claims, 1 Drawing Sheet

METHOD AND APPARATUS FOR ENHANCEMENT OF PRIMARY PYROELECTRIC RESPONSE

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates to energy detectors, and more particularly to such detectors having a weak primary response to incident energy pulses, followed by a stronger secondary response, such as pyroelectric infrared detectors.

Pyroelectric detectors are known, and described in U.S. Pat. Nos. 4,060,729, 3,773,564 and 4,117,328, for example.

As known in the art, such devices typically provide an output voltage which is proportional to the time rate of change of the temperature thereof. While such rate change responses are useful in detecting the existence of a pulse of incident energy, it is often desirable to detect the actual temporal waveshape of the incident energy pulse. Such temporal detection enables more detailed investigation of high frequency information in the incident energy.

For example, in the field of laser diagnostics, the determination of a laser's function is often made by observation of its output waveform. Thus, measurement of actual output intensity and its variation as a function of time is required, rather than merely detecting the presence of an output pulse. Other applications in which pulse-code modulated signals are detected similarly require observation of actual signal waveforms rather than detection of the existence of a signal or its variation.

Further, it is desired to increase the detectivity, or sensitivity, of energy detectors for reproducing substantially the exact shape of an incident pulse of energy.

Such responses are particularly desirable for high frequency pulses, for example pulses having subpicosecond durations. Because of the slow response and poor detectivity of existing pyroelectric devices, these detectors are not useful in applications as above described.

However, pyroelectric devices are now known which include both a primary and a secondary response. The "primary pyroelectricity" response is virtually simultaneous with the impinging energy pulse (such as infrared radiation), having a $10^{-13}$ second coupling time, for example. The wide band response available under the primary pyroelectric effect is, however, quite weak in comparison with the secondary pyroelectric response. It is accordingly the secondary response, occurring substantially later than the primary response, which is typically used in commercial utilizations of pyroelectric devices. Stotlar et al, in 1979 *IEEE Symposium on Applications of Ferroelectrics,* Symposium Digest, page 95, June 1979, describe the use of the primary pyroelectric response for detection of 10.6 micron laser pulses. Such applications of primary pyroelectric properties have thus far been limited to high energy pulses, however, because of the weak primary responses. Experimentation with the primary pyroelectric response has been limited to real time detection of high energy pulses. Application to low energy incident radiation has not been practical.

While the prior art includes a number of circuits for reducing noise in detected radiation, as illustrated by Cohn 4,081,679, Zeldman 3,723,737, and Douglas 3,855,864, the prior art has failed to provide a device for detection of weak signals using a primary pyroelectric effect.

In a more general sense, the prior art fails to provide either a method or apparatus for enabling reliable use of a primary response of an energy detector which also possesses a secondary response, where the primary response provides an accurate and rapid, but weak, response to incident energy, while the secondary response is stronger, but is delayed and has a lesser accuracy than the primary response. Thus, particularly with respect to pyroelectric detecting devices, the primary response, although it more accurately reflects the temporal waveshape of the incident radiation, is essentially not usable, particularly for detection of low power incident radiation.

SUMMARY OF THE INVENTION

It is accordingly a primary object of the present invention to overcome the difficulties of the prior art and to provide both a method and apparatus for utilizing the primary response of an energy detector although the primary response may be weaker than an available secondary response.

It is a more specific object of the invention to provide a circuit for outputting an enhanced signal representing the primary response of an energy detector, thereby to replicate the waveform of a pulse of incident energy.

It is still another object of the invention to provide circuitry enabling the use of a secondary response of an energy detecting device to detect a primary response, and to provide an output signal representative of the primary response.

It is an additional object of the invention to provide a correlating circuitry, triggered by a secondary response of an energy detecting device, to provide an output signal representative of a primary response of the energy detector and having an enhanced signal-to-noise ratio.

It is yet another object of the invention to provide circuitry for delaying a weak primary response of an energy detector and for directing a stronger, secondary response to a correlator for triggering the latter to provide an output signal representative of the primary response and of a pulse of incident energy.

In accordance with the foregoing and other objects, the present invention provides a method for enhancing the temporal resolution of an incident energy pulse by an energy detector having a weak primary response and a strong secondary response. In the method, the occurrence of the secondary response is sensed for indicating the incidence of the pulse of energy. The primary and secondary responses are correlated in order to obtain a function that is related to the temporal shape of the incident energy pulse.

The present invention further includes the step of delaying the primary response and of cueing a correlating means to provide an output which is substantially identical with the primary response.

The cueing step may further include a step of filtering the secondary response through an inverse matched filter for the energy detector.

Moreover, in order to provide responses for long duration incident radiation, a modulating step is provided for such radiation. Triggering steps are included for gating the detector output to the delay means and for delayedly gating the detector output to cue the correlating means, and for triggering the modulation of the radiation.

Circuitry is further provided for carrying out the steps in the above method.

Still other objects and features of the present invention will become more readily apparent to those skilled in the art from the following description wherein there is shown and described a preferred embodiment of the invention, simply by way of illustration of one of the best modes contemplated for carrying out the invention. As will be realized, the invention is capable of other, different, embodiments and its several details are capable of modifications in various obvious aspects, all without departing from the invention. Accordingly, the drawing and description is provided for illustration and not for limitation of the invention.

BRIEF DESCRIPTION OF THE DRAWING

The foregoing and other features, objects and advantages of the present invention will be more readily appreciated upon reference to the following description of a preferred embodiment of the invention, when taken in conjunction with the accompanying drawing in which.

DETAILED DESCRIPTION OF A PREFERRED EMBODIMENT

Figure 1:
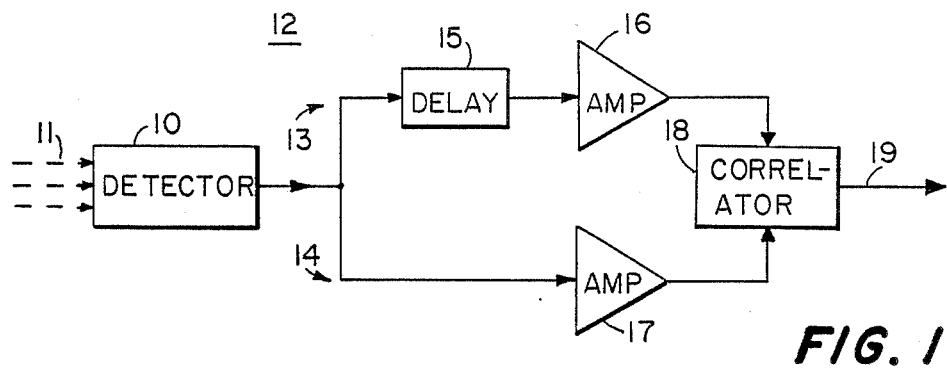
FIG. 1 shows a block diagram of a circuit implementing the present invention.

Reference is now made to FIG. 1, showing circuitry providing enhanced high frequency response of an energy detector in accordance with the present invention. An incident energy detector 10 is shown as receiving a pulse of incident energy 11. Preferably, the invention relates to a pyroelectric detector responsive to incident infrared radiation.

The inventive circuitry is generally shown at 12, and includes a first circuit branch 13 and a second circuit branch 14 receiving the output of detector 10. Circuit branch 13 includes a delay 15, which may be analog or digital. Analog delay lines are preferred, however. Acoustic delay lines may be used, as may broadband transmission lines. In view of the nature of the pulses, the delay line must be broadband, thereby to provide faithful replication at its output of the short input pulses. For high bandwidth pulses, a delay line bandwidth of approximately 1 GHz is desirable.

The delay length is preferably in the 100 ns range, and is typically dictated by the thickness of the detector. Thus, for a hundred micron thick pyroelectric detector the time required for producing the secondary response, which is essentially an acoustic or sound velocity phenomenon, is approximately 100 ns.

The purpose of the delay line is to delay the primary response of the detector until the secondary response has been produced. A pair of low-noise amplifiers 16 and 17 is provided in first and second circuit branches 13 and 14, respectively. Accordingly, the delayed output of the detector 10, as provided by delay 15, is passed through amplifier 16 to a correlator 18. The output detector 10 is also passed through amplifier 17 to the correlator. As will be appreciated, at the time of arrival at the correlator of the primary response from the detector, passing through amplifier 17, no response will have passed through delay 15 in circuit branch 13 to reach the other input of the correlator. However, by the time the secondary response of detector 10 has passed through amplifier 17 and reached correlator 18, the primary response, having been delayed by delay 15, will have passed through amplifier 16 and will thus be provided at the other input of correlator 18.

The circuit shown in FIG. 1 thus provides correlation of the primary and secondary responses of detector 10, in order to provide an enhanced primary output response on output terminal 19.

Correlation is a well-known method for extraction of signals from a noisy environment, Cohn U.S. Pat. No. 4,081,679 and as illustrated by Section 10.3 of Skolnik, *Introduction to Radar Systems*, 2nd Ed., McGraw Hill, 1980.

Correlator 18 which may be analog or digital but is preferably analog for reasons of rapid response, may include a tapped delay line structure using surface acoustic waves or acousto-optic delay line processors. The tapped delay line type of correlator is substantially more compact than the acousto-optical type, and is accordingly the correlator of choice in the preferred embodiment. It is recognized that such a correlator is less flexible than the acousto-optic variety, however.

In order to reproduce the short input pulse, and its fine details, the correlator bandwith must be sufficiently high (multi GHz, for example). The correlator's operating window further must be sufficiently long to accept pulses of some predetermined expected value. Preferably, the window should be at least as large as the expected pulse lengths.

In order for the correlator 18, which is a cross-correlator for the signals from the two circuit branches 13 and 14, to provide an enhanced signal-to-noise ratio for the primary response arriving on circuit branch 13, it is necessary for both pulses at the correlator to have substantially identical shapes. That is, in order to enhance the output sensitivity to the incident radiant energy pulse as represented by the waveshape of the primary response of the detector 10, it is preferable for the secondary response of the detector to possess a waveshape similar to that of the primary response. However, the two responses are different in their natures. For example, as described in Auston and Glass, at *Applied Physics Letters*, Vol. 20, page 398 (1972), the mechanism responsible for the fast primary response is the difference in dipole moment between the ground and excited states of the absorption centers of the detector. This mechanism produces a rapid output pulse substantially tracking the temporal waveshape of the impinging radiation pulse. However, the secondary response, which is an acoustic phenomenon caused by the piezoelectric nature of the detector and is a response to thermal expansion of the piezoelectric material, is primarily responsive to the time rate of change of the device temperature. The secondary pulse wave shape thus differs from the primary response pulse.

Figure 2:
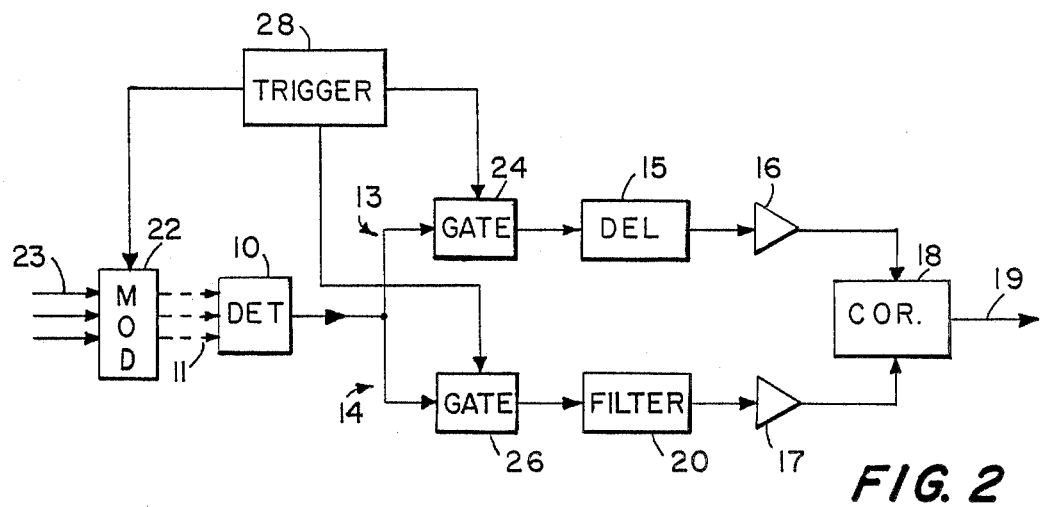
FIG. 2 shows a modification of the circuit of FIG. 1, including a modulating device for long-duration radiation.

Inasmuch as the impulse response of the detector, its biasing network, and the stray lead capacitances and inductances is known, an analog discrete filter may easily be designed to have a response matched to, and the inverse of, the detector response. Such an inverse matched filter is shown at 20 in FIG. 2. The output of filter 20 is thus more faithful to the incident energy pulse. Accordingly, the output of correlator 18 in FIG. 2 involves an increased signal-to-noise ratio for the primary response of the detector 1, and essentially replicates the incident pulse waveshape. The correlator output of FIG. 1, which cross correlates the (unfiltered) secondary response with the detector's primary response, is a better indicator of the waveshape of the incident pulse of energy than is available from the secondary response typically used in pyroelectric radiation detection devices. However, the filtration provided in FIG. 2 results in improved tracking of the primary response of the detector, and thus of the temporal incident energy waveshape.

It is also possible to provide another filter in the second circuit branch, for filtering out any detectable noise from the secondary response. If such a filter is provided ahead of the inverse matched filter 20, filter 20 would of course reflect an inverse match to the cascaded characteristic of the detector and the noise filter (not shown).

The inverse matched filter 20 may be designed in accordance with the standard principles described in typical design handbooks such as Hardy, *High-Frequency Circuit Design,* Reston Publishing Company, 1979, or in *A Handbook on Electrical Filters,* White Electromagnetics, Inc., (1963). Specifically, the "smeared", slow, secondary pyroelectric response may be thought of as a low-pass frequency effect of the detector. The inverse matched filter can thus be designed as a high-pass filter. Such filtering may either be analog, as described with respect to the above-cited references, or digital. The latter approach is desirable for situations in which the filtering process is iterated. Such a duration is particularly attractive when some information is also available from the primary response to guide the iteration process.

It is recognized that not all radiation will be incident upon the detector structure 10 in appropriately short pulses to permit the primary delay and correlation function to be accurately performed. Thus, for long duration incident radiation, particularly for continuous radiation or for incident pulses longer than the acoustic transit time across the detector, a modulating means is required. Any modulator capable of providing appropriate chopping to the incident radiation is useful. For example, electro-optical modulators, such as a Pockel's cell, may be used, such a modulator is symbolically shown at 22 in FIG. 2, and is used to convert incident, long-duration radiation shown at 23 to the appropriate pulse format at 11, for enabling operation of detector 10 in the inventive circuit. Typical modulators which may be used in this circuit are of the electro-optic or acousto-optic type, available from Coherent Inc., Modulator Division, Danbury, Conn., and mechanical choppers available from American Time Products Division, Frequency Control Products, Inc., Woodside, N.Y. The first two types of modulators work best with incident laser light, while the last works with all types of incident lights.

Referring again to FIG. 2, a pair of gating circuits 24 and 26 is provided, controlled by a trigger source 28. Trigger source 28 may be a pulse generator, for appropriately activating modulator 22 to pass a particular pulse of impinging energy to detector 10. Trigger 28 further provides a first gating signal to gate circuit 24 for passing the primary response of detector 10 to delay circuit 15. At an appropriately delayed time, trigger source 28 provides a delayed trigger to gating circuit 26 for passing the secondary response of detector 10 to the inverse matched filter 20.

The trigger source 28 thus provides synchronization between the modulating source 22 and the primary and secondary responses provided to circuit branches 13 and 14. It should also be noted that the trigger source 28 and gating circuits 24 and 26 may be supplied to the circuit of FIG. 1, without the modulator 22. That is, a separate synchronizing source may be used in the circuit of FIG. 1 to assure appropriately timed passage only of the primary response to the first circuit branch, and appropriately timed passage of only the secondary response to the second circuit branch.

Modulation is preferably at a chopping frequency wherein the detector has a high responsivity. For example, typical pyroelectric IR detectors have a flat responsivity curve to 15 Hz. Thus, chopping at frequencies of up to approximately 15 Hz, but generally at the frequency of maximal responsivity, will not result in degraded performance.

Figure 3:
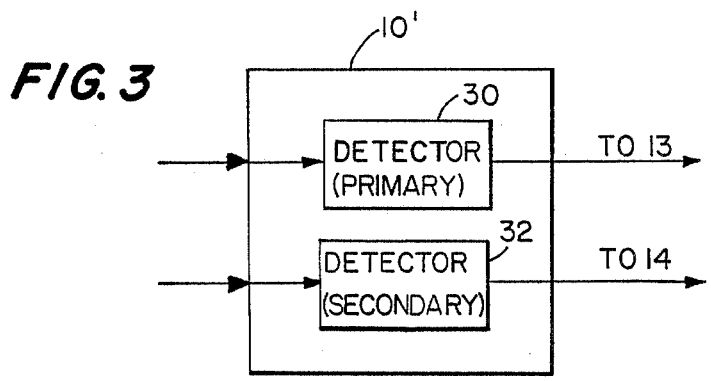
FIG. 3 shows an alternate embodiment for an incident energy detector used in FIGS. 1 and 2.

Yet another embodiment of the present invention is illustrated in FIG. 3, in which the detector 10' is shown as comprising a pair of separate detectors 30 and 32. Detector 30 is a detector providing a primary response to incident energy, while detector 32 provides a secondary response to the incident energy. Thus, when energy from a common source phenomenon is incident on the two detectors 30 and 32, the primary and secondary responses to substantially the same incident energy provided on two separate leads, rather than on the same lead by the same device. The two outputs of the detectors 30 and 32 are provided to the first and second circuit branches 13 and 14, respectively, for processing in accordance with the concepts of FIGS. 1 and 2. The output leads may be combined, however, to simulate detector 10 of FIGS. 1 and 2.

The detectors 10 (in FIGS. 1 and 2), 30 and 32 may be of the types provided by the Barnes Engineering Company, for example, of Stanford, Conn., or the type described in the Stotlar et al publication or in Stotlar et al, "Ultrafast Pyroelectric Detectors for $CO_2$ Laser Measurements", *J. Optical Soc.,* Vol 69, No. 2, page 373 (February 1979).

The foregoing specification has thus described a method and apparatus for enhancing the signal-to-noise ratio of a weak response following the waveshape of an input incident radiation pulse by correlation with a secondary response providing a delayed, stronger output signal which does not, however, follow the input waveform. The cross-correlated responses may both originate in the same device, or may originate in different devices, monitoring a single event.

The foregoing description of preferred embodiments does not, however follow the input waveform. The crosscorrelated responses may both originate in the same device, or may originate in different devices, monitoring a single event.

The foregoing description of preferred embodiments of the invention has been presented for purposes of illustration and description, and is not intended to be exhaustive or to limit the invention to the precise forms disclosed. The embodiments were chosen and described in order best to explain the principles of the invention and its practical application, thereby to enable others skilled in the art best to utilize the invention in various embodiments and with various modifications as are suited to the particular use contemplated. I wish it to be understood that I do not desire to be limited to the exact details of construction shown and described, for obvious modifications can be made by a person skilled in the art.

I claim:

1. A method for enhancement of a temporal resolution of an incident pulse of energy by a pyroelectric energy detector having a weak primary pyroelectric response and a strong subsequent secondary pyroelectric response, comprising the steps of:
sensing an occurrence of the primary response,
sensing an occurrence of the secondary response such that there is indicated the incidence of the pulse of energy on the detector, and
correlating said primary and secondary responses to obtain a replica of the temporal shape of the incident pulse of energy.

2. The method of claim 1 wherein:
said primary response sensing step further comprises the step of passing the detector response through a delay line, thereby to delay the primary response into substantial coincidence with the secondary response; and
said correlating step comprises a cueing step wherein the secondary response cues a correlating means to provide an output related to and corresponding to said primary response.

3. The method of claim 2 wherein said cueing step further comprising a filtering step wherein said secondary response is passed through an inverse matched filtering means to provide a cueing pulse for said correlating means more nearly representative of the incident pulse of energy than said secondary response.

4. The method of claim 3 further comprising gating steps for gating the response of said detector to said delay line and for delayedly gating the response of said detector to said filtering means.

5. The method of claim 2 further comprising the steps of:
modulating incident long duration radiation to provide said pulse of energy incident on said detector, and
triggering the occurrence of first and second temporally delayed gating signals to correspond with the occurrence of said primary and secondary responses of said detector, for gating said detector responses to said delay line and for delayedly gating said detector responses to cue said correlating means,
wherein said secondary response cues said correlating means to respond to said primary response provided by said delay line.

6. In an energy detection apparatus, including a pyroelectric detecting means having a primary pyroelectric response and a subsequent secondary pyroelectric response to incident energy, circuit means for enhancing the primary response of said detecting means comprising:
means for sensing the occurrence of the primary response,
means for sensing the occurrence of the secondary response and thereby the incidence of a pulse of energy on the detecting means, and
means responsive to said means for sensing the primary and secondary responses for providing an output signal representative of the primary response of said detecting means.

7. The circuit means recited in claim 6 further comprising:
a first circuit branch connected in circuit for receiving the responses of said detecting means, including a delay means for delaying the primary response of said detecting means;
a second circuit branch connected in circuit for receiving the responses of said detecting means and including said means for sensing the secondary response therein, for providing said secondary response therefrom in substantial coincidence with said delayed primary response from said first circuit branch;
said means responsive to said means for sensing the primary and secondary responses comprising correlating means connected for receiving said delayed primary response and said secondary response from said first and second branches, respectively;
such that said means for sensing the secondary response, upon occurrence of said secondary response, cues said correlating means to provide an output corresponding to said primary response with enhanced replication of temporal characteristics of the incident pulse of energy.

8. The circuit means recited in claim 7 wherein said means for sensing the secondary response further comprises filtering means in said second circuit branch, said filtering means comprised of an inverse matched filtering device for said detecting means, whereby a cueing pulse more nearly representative of the input pulse of energy than said secondary response is provided by said second circuit branch to said correlating means.

9. The circuit means recited in claim 8 further comprising gating means for gating the responses of said detecting means to said first circuit branch having said delay means, and for delayedly gating the responses of said detecting means to said second circuit branch having said filtering means.

10. The circuit means recited in claim 7 further comprising:
modulating means for modulating incident long duration radiation to provide said pulse of energy incident on said detecting means,
first and second signal gating means disposed in said first and second circuit branches, respectively, and
triggering means for triggering said first and second gating means in substantial correspondence with the occurrence of said primary and secondary responses of said detecting means, respectively, for gating said detecting means responses to cue said correlating means,
said secondary response thereby cueing said correlating means to respond to said primary response provided by said delay means.

11. The circuit means recited in claim 10 wherein said triggering means is connected for triggering said modulating means.

12. The circuit means recited in claim 6 wherein said detecting means comprises a single pyroelectric detector providing both primary and secondary responses to incident energy.

13. The circuit means recited in claim 6 wherein said detecting means comprises a plurality of pyroelectric detectors,
one of said pyroelectric detectors providing said primary response to said incident energy and another of said pyroelectric detectors providing said secondary response to said incident energy.

* * * * *